Figure 1:
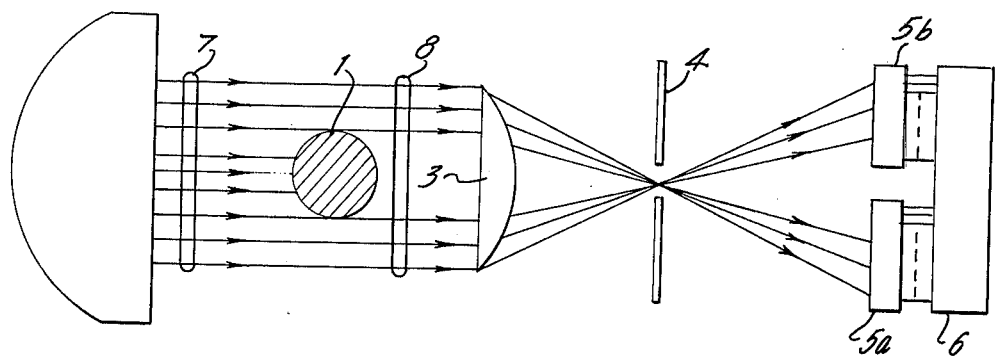

United States Patent [19]

Wiklund

[11] 3,947,129
[45] Mar. 30, 1976

[54] APPARATUS FOR CONTACTLESS MEASURING OF THE DIMENSIONS OF OBJECTS

[75] Inventor: Klas Rudolf Wiklund, Taby, Sweden
[73] Assignee: AGA Aktiebolag, Lidingo, Sweden
[22] Filed: Oct. 3, 1974
[21] Appl. No.: 511,610

[30] Foreign Application Priority Data
Oct. 12, 1973 Sweden............................. 7313868

[52] U.S. Cl.................................. 356/159; 356/199
[51] Int. Cl.²............................................. G01B 11/10
[58] Field of Search............ 350/190; 250/559, 560; 356/159, 160, 199, 200

[56] References Cited
UNITED STATES PATENTS

| | | | |
|---|---|---|---|
| 3,224,322 | 12/1965 | Westbrook........................... | 356/160 |
| 3,649,122 | 5/1972 | Holtz................................... | 356/172 |
| 3,737,856 | 6/1973 | Lehrer et al......................... | 356/160 |
| 3,743,428 | 9/1973 | Brown................................. | 356/160 |
| 3,874,798 | 4/1975 | Antonsson et al.................. | 356/159 |

*Primary Examiner*—John K. Corbin
*Assistant Examiner*—Richard A. Rosenberger
*Attorney, Agent, or Firm*—Lerner, David, Littenberg & Samuel

[57] ABSTRACT

The present invention relates to an apparatus for contactless measuring of dimensions of objects, in particular the measurement of the diameter of moving wire in a wire-mill, whereby the contours of the object in one dimension are arranged by means of an optical system to be projected on an opto-electrical member, the output signal of which being a measure of the dimension wanted.

2 Claims, 5 Drawing Figures

APPARATUS FOR CONTACTLESS MEASURING OF THE DIMENSIONS OF OBJECTS

BACKGROUND OF THE INVENTION

In Swedish published application 348,831, filed Jan. 5, 1971, now abandoned, and in corresponding U.S. Pat. application Ser. No. 268,275, filed July 3, 1972, now abandoned, a method is described for contactless measurement of in particular movable wire in a wire-mill. This known measurement takes place so that light from a lamp is allowed to fall onto the wire in such a manner that the contours of the wire are projected onto an opto-electric component consisting of a number of photodiodes, the illumination of which is scanned successively in synchronism with a clock frequency, whereupon the signals from illuminated and non-illuminated photodiodes, respectively, are separated for the recording of the image position of the contours of the object.

Between the wire and the opto-electrical component in this known apparatus a lens system is arranged. This system of lenses brings about a projection of the contours of the wire onto the opto-electrical component.

In a further development of said known method the lens system comprises a telecentric diaphragm, whereby errors caused by the movements of the beam perpendicular to the optic axis of the lens system and perpendicular to the longitudinal direction of the wire are suppressed as shown in U.S. Pat. No. 3,874,798.

SUMMARY OF THE INVENTION

The present invention relates to an improved lens system e.g. in an apparatus such as the one described above. The invention is however, not restricted to be used in connection with such opto-electrical components or to such treatment of signals from the opto-electrical component as described in the above-mentioned prior publications.

According to the above-mentioned prior publications the wanted dimensions of the object may be measured by sensing the change in light intensity between the object and the background by means of the opto-electrical component. Since the lens optics in the known arrangements is circular the lens ought to be masked in case a moving or vibrating wire shall be measured and it should be masked in such a way that a small slit is left free preferably through the center of the lens.

Another possible way of measuring moving vibrating objects is to mount a telecentric diaphragm between the lens and the opto-electrical element. The telecentric diaphragm must, however, have a small aperture as well as the masked lens, and therefore a lamp having a great luminous intensity must be used to illuminate the object since otherwise the reliability of the measurement will be jeopardized on account of bad signal/-radiation relation. This implies that the service length of the lamp will be comparatively short.

In the apparatus according to the invention such drawbacks are eliminated.

In the apparatus according to the invention a light source has been so located that the object to be measured has screened a part of the light from the light source, whereby the width of said screening has been a measure of the dimension wanted. In another embodiment hand lamps with screens have been placed so that they illuminate the side of the object which is turned toward the opto-electrical member. In this way, light from the lamps will be reflected by the object onto a lens and through an aperture 4 onto the opto-electrical sensing means.

The apparatus according to this invention is characterized in what is disclosed in the attached claims.

Figure 2:
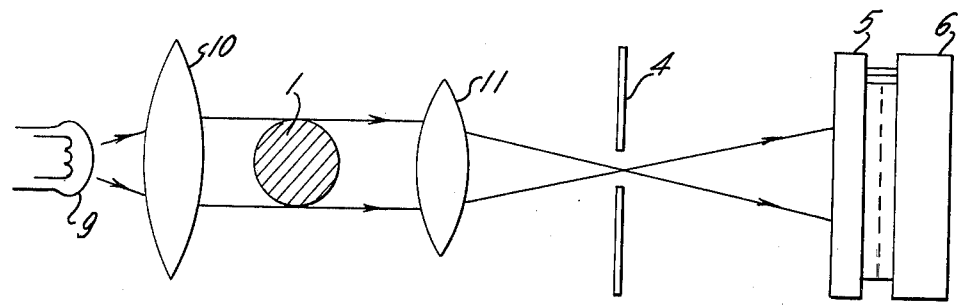
Figure 3:
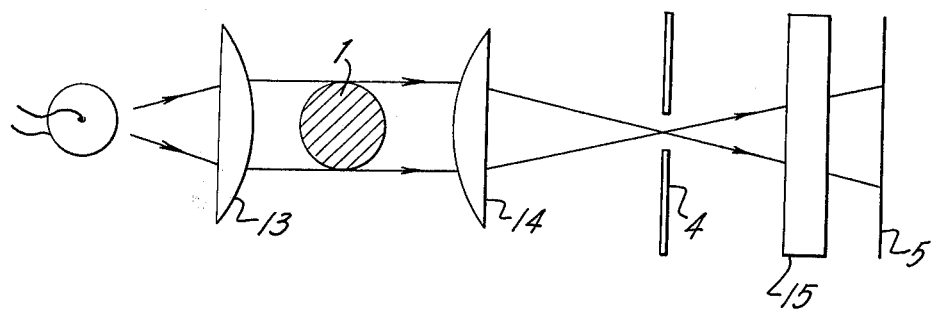
Figure 4:
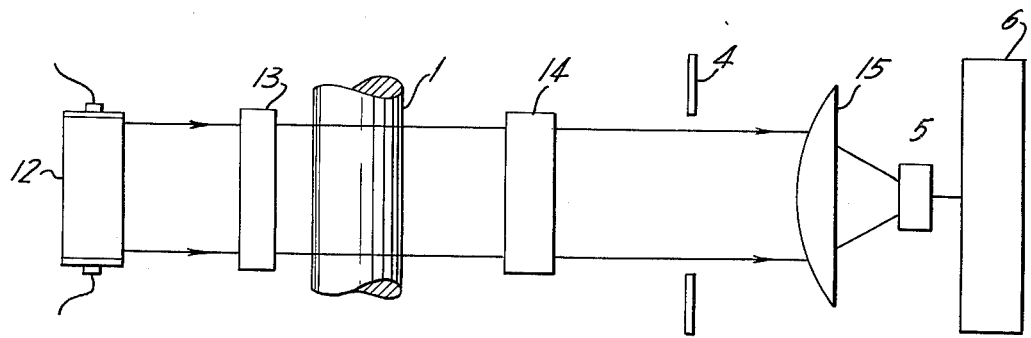
Figure 5:
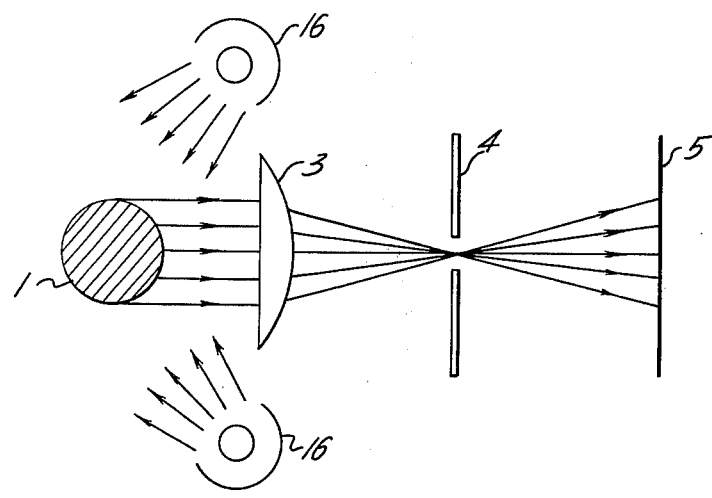

The apparatus according to the invention will be described in more detail with reference to the accompanying drawings, in which FIG. 1 shows an embodiment of the apparatus according to the invention, FIGS. 2 and 3 show alternative embodiments of the apparatus according to the invention, FIG. 4 shows the apparatus according to FIG. 3 in a different projection, and FIG. 5 shows a further embodiment of the apparatus according to the invention.

In FIG. 1 the object whose dimension is to be measured is designated 1. In this case the object is assumed to be a wire, which is shown in cross-section in the Figure. The wire is illuminated by means of a lamp, from which a light beam 7 is emitted. This beam is allowed to strike the wire whereby a part of the beam is screened so that light beams 8 on the opposite side of the wire 1 with regard to the lens 3 are formed by the light passing the wire, whereby, if a section is imagined through the light beam 8 this section will show a screened belt having a width corresponding to the diameter of the wire. The light beam 8 passes through a cylinder lens 3, whereby the beams are focused in one direction as shown in the Figure through a slit aperture 4.

After the slit aperture 4 an opto-electrical member 5 is so arranged that the beams through said slit aperture strike said member in such a way that the contours of the wire 1 are projected onto the opto-electrical member 5. In FIG. 1 the opto-electrical member 5 is divided into two section members 5a and 5b, respectively. These section members are so located that one contour of the wire 1 is projected onto one section member and the other contour on the other section member. Thus, when thick wires shall be measured or when the optics makes the projected contours fall wide apart on the opto-electrical member the advantage can be achieved that the light sensitive surfaces only need a small extension around the area where the contours are expected to be projected.

Said opto-electrical members may consist of photodiode arrays which are common on the market and which are often realized in integration techniques and which in many cases are combined moreover with read-out electronic devices. The block which is designated 6 in FIG. 1 may thus contain read-out electronic devices together with a visual read-out unit or only the last-named unit.

Said photodiode array consists of a multiplicity of photodiodes placed very tightly together. The read-out electronics is combined with the photodiode array and mounted in the same capsule. This electronic device comprises a shift register which ensures that the photodiodes are scanned one after the other in a certain order. From this opto-electrical element combined to a unit a signal is picked up which may be fed to a visual read-out unit and/or to a fault indicator unit from where an alarm may be sounded in case the measured dimensions of the object depart in either direction from certain values specified in advance.

As mentioned before the contours of the wire 1 are projected onto the opto-electrical member 5 by means of the cylinder lens 3. This cylinder lens allows a longer measuring length along the wire to be used. This has the advantage that no masking of the aperture of the optics is needed, as all parts of the light through the optics are equally directed after the cylindrical lens, that refracts the light to one beam, which gives a thin streak of light on the focal distance where the slit aperture is located. This slit aperture has the effect that only the light which is parallel at the wire will strike the opto-electrical member. This parallel light beam is directed perpendicularly onto the diameter to be measured. After the slit 4 the scanning means can be placed at a comparatively arbitrary distance and by means of the cylinder lens obtain an intenser illumination than in arrangement known per se, and consequently a better detecting capacity is achieved, and the lamp needs not have such a great power as in arrangements known per se.

FIG. 2 shows a somewhat modified embodiment of the arrangement in FIG. 1. The object, the dimension of which shall be measured is designated 1. Also in this case it has been assumed that the object is a wire.

A lamp 9 emits light directed to the wire 1. Between this lamp and the wire a condenser 10 is mounted. This condenser consists of an axially symmetric lens. After the wire 1 a cylinder lens 11 is arranged. In FIG. 1 the corresponding lens 3 is made planoconvex. The lens 11 has two convex surfaces. These different embodiments of the lens are not essential for the idea of the invention, but can be of a certain practical importance according to what is mentioned below. The slit aperture 4, the opto-electrical member 5 as well as the read-out electronics 6 resemble the corresponding components in FIG. 1 except that the opto-electrical member 5 in FIG. 2 is drawn as one sole unit.

The condenser 10 in the apparatus according to FIG. 2 has the same function as corresponding arrangement in ordinary projectors known per se.

In FIG. 3, 12 designates a tube-formed lamp e.g. a fluorescent tube. The light from this lamp 12 is directed onto the object 1, the dimension of which shall be defined. The object in this case is a wire. Between the wire 1 and the lamp 12 a condenser of cylindrical shape is arranged.

Further the apparatus comprises a cylindrical lens 14, followed by a slit aperture 4, a cylindrical lens 15 and finally, the opto-electrical member schematically indicated by a line 5 and the read-out electronics.

FIG. 4 shows the arrangement in FIG. 3 in a projection turned 90° in relation to the one in FIG. 3. The symbols are the same as in FIG. 3. FIG. 4 also shows the opto-electric member 5 and the read-out electronics 5.

When regarding simultaneously the FIGS. 3 and 4 the purpose of the different lenses is evident. The cylindrical condenser 13 refracts the light from the light source 12 so that the light beams are principally parallel when passing the wire 1. This refraction takes place only in one level and therefore the extension of the lamp in the longitudinal direction of the wire may cause a light area widely extended in this direction, said extension not being effected by the lens 13. The long and narrow light configuration in the longitudinal direction of the wire is not appreciably effected by the cylinder lens 14. On the other hand, said long and narrow light area is refracted by the cylinder lens 15, so that the light area striking the opto-electrical member 5 has a small extension in the longitudinal direction of the wire. In this manner, the advantage of using a longer measuring length of the wire can be utilized so that the information from the whole of this length is converged to fall on the narrow photodiode array. In this way the illumination on the photo-sensitive element is increased.

FIG. 5 shows a further embodiment of the arrangement according to the invention. The object, the dimension of which shall be measured is designated 1. In accordance with the above-described arrangements, a cylinder lens 3 is placed after the object followed by a slit aperture 4 and a schematically shown opto-electrical member with read-out electronics 5.

In the above-described embodiments of the apparatus according to the invention a light source has been so-located that the object to be measured has screened a part of the light from the light source, whereby the width of said screening has been a measure of the dimension wanted. In the apparatus according to FIG. 5, on the other hand, lamps with screens 16 have been placed so that they illuminate the side of the object which is turned to the opto-electrical member. In this way, the light from the lamps 16 will be reflected by the object 1 onto the cylinder lens 3 and through the aperture 4 onto the opto-electrical member 5.

In connection with the different embodiments shown of the apparatus according to the invention it has been mentioned that the radiation source which illuminates the object to be measured, is a lamp. This lamp is then associated with one emitting visible light, but it ought to be pointed out that radiation sources emitting ultra-violet or infrared light may very well be used. Also lamps emitting a certain specific frequency of visible light may be used. In these latter cases the opto-electrical member may be provided with a filter to remove other radiation than the one emitted by the radiation source used in the apparatus.

The apparatus according to the invention is especially suitable for measuring the dimension of a wire in a wire-mill. The wire is then moving and vibrates and it has often such a high temperature that it emits infrared rays. The wire can then in certain cases itself be the radiation source, and therefore no further radiation sources are needed.

In the embodiments described above each cylinder lens has been drawn singly. According to known optical techniques it may however in certain cases be of advantage to use more cylinder lenses lying close together. The curved surfaces of said lenses can then be directed in the same direction or they can be opposed, depending on what is most suitable in each single case.

The shape of each cylinder lens is among other things due to the distance between the different components in the apparatus. In the embodiments described the cylinder lenses are generally planoconvex. In one case, however, a cylinder lens has been shown having two convex surfaces with principally the same radius. However, it can in certain cases be of advantage to use a cylinder lens with two convex surfaces, but one surface being considerably more curved than the other. Further, it is generally more preferable to turn the cylinder lens so that is most curved surface is in the direction where the rays are mostly parallel.

In every single case consideration must be taken to the dimensions of the arrangement when constructing a cylinder lens. In this way, economic reasons are essential as in many cases it is of advantage to use standard design.

The arrangement according to the invention has the advantage that a longer measuring length along the wire can be utilized than in arrangements having axially symmetric lenses and no especially expensive optic members need for that reason be comprised in the arrangement.

What is claimed is:

1. Apparatus for contactless measuring of dimensions of a moving object, whereby the contours of the object in one dimension by means of an optic system are arranged to be projected onto an opto-electrical member, the output signal of which is a measure of the dimension to be defined, comprising an optical system having a first part comprising at least one cylindrical lens, the cylindrical axis of which is at right angles to the dimension to be defined and a slit aperture located between said lens and an opto-electrical means, said slit aperture being so arranged that substantially only beams perpendicular to the dimension to be defined pass through said slit aperture, the distance between said opto-electrical means and said slit aperture being adjusted so that the projection of the object falls in the active area of said opto-electrical means.

2. Apparatus according to claim 1, wherein said optical system also comprises a second part located between said aperture and said opto-electrical means, said second part comprising a cylinder lens turned 90° in relation to said cylinder lens in said first part.

* * * * *